Patented Oct. 11, 1938

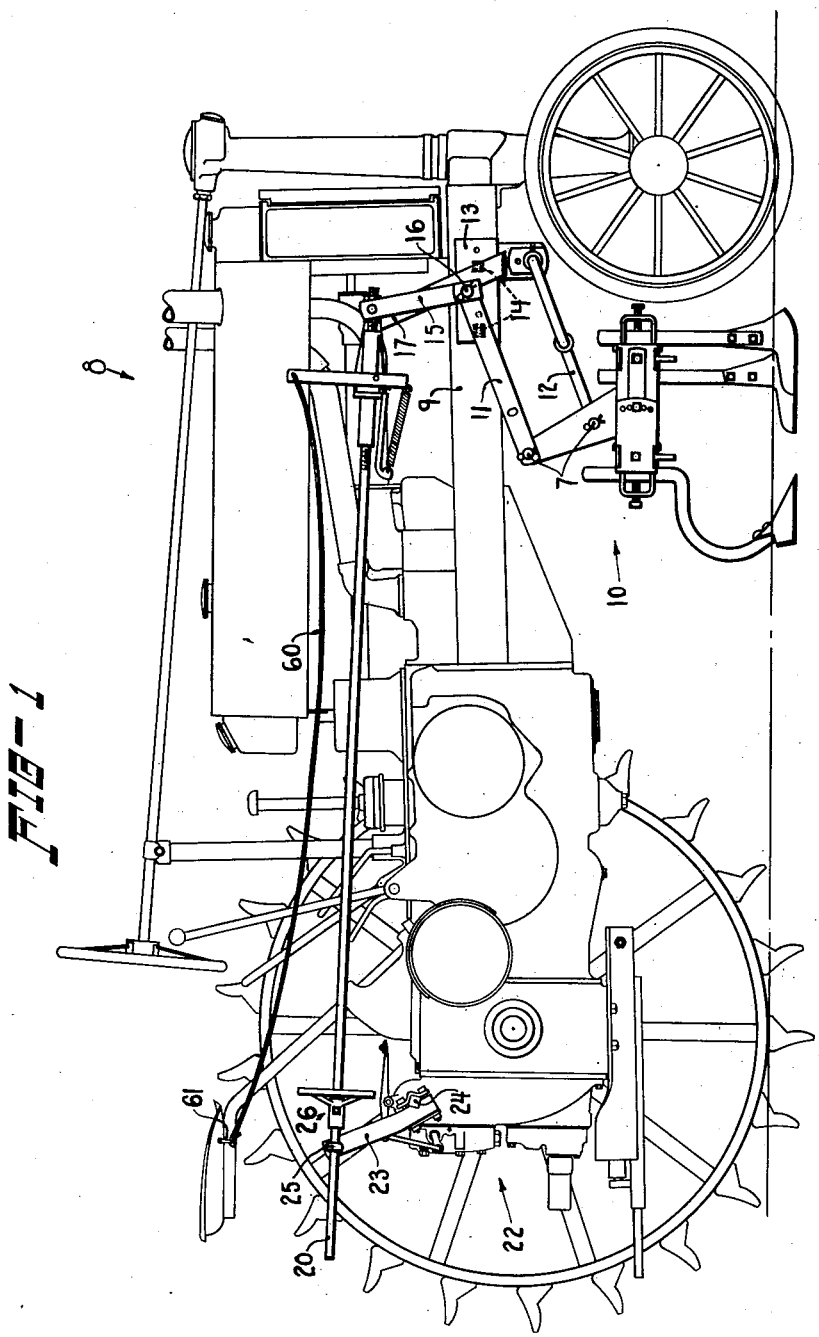

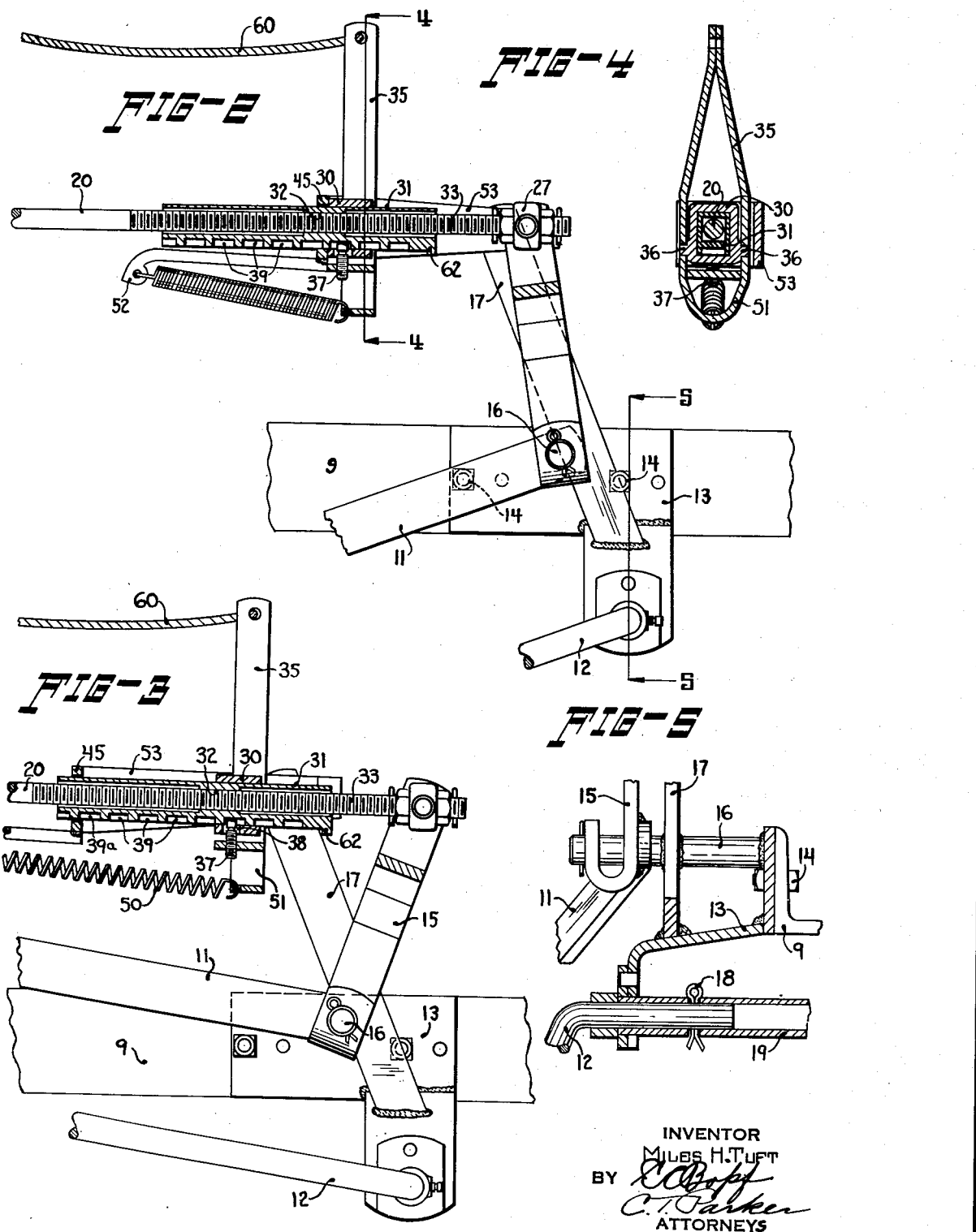

2,133,180

UNITED STATES PATENT OFFICE 2,133,180

DEPTH-ADJUSTING MECHANISM

Miles H. Tuft, Moline, Ill., assignor to Deere & Company, Moline, Ill., a corporation of Illinois Application August 1, 1936, Serial No. 93,836

26 Claims. (Cl. 97—47)

This invention relates to a new depth-adjusting mechanism for ground-working implements, by which the depth of operation of the ground-working tools can be accurately controlled. In certain kinds of cultivating implements, it is desirable that the operator be able to adjust the depth of operation of the ground-working tools within very close limits over a relatively wide range, and it is the main object of my invention to provide a mechanism in which this can be expeditiously accomplished.

It is frequently desirable to connect one implement, such as a planter, at the rear of a tractor, and another implement, such as a cultivator, at the forward end of the tractor, in which case one of the implements is used while the other is held in an inoperative position. This requires that the operative implement be connected to the power lift while the inoperative implement be locked in raised or inoperative position independent of the raising and lowering of the other implement by the power lift. It is, therefore, a further object of this invention to provide a mechanism by which an implement can be raised to inoperative position and then locked in such position regardless of further operation of the lifting mechanism.

A further object of my invention is to provide a depth-adjusting mechanism that is controlled by rotation of the lifting member through which the raising and lowering of the implement is accomplished.

It is a further object of my invention to provide a depth-adjusting mechanism, which is a unitary part of the implement and does not require connection with the tractor separately from the connection by which the implement is connected with the tractor. This facilitates attachment and detachment of the implement with the tractor.

A preferred embodiment of my invention is disclosed in the accompanying specification and drawings in which:

Figure 1 is a side view of my invention as applied to a tractor-mounted cultivator, the tractor being equipped with a power lift mechanism for supplying the power for lifting the cultivating tools out of operating position;

Figure 2 is an enlarged fragmentary view of the adjusting mechanism with certain parts shown in section for better illustration. In this view the parts are shown in the position they assume when the cultivator is in an operating position;

Figure 3 is a view similar to Fig. 2 except that the parts are shown in the position they assume when the cultivator is in a raised position;

Figure 4 is a cross-sectional view along the line 4—4 of Fig. 2; and,

Figure 5 is a cross-sectional view along the line 5—5 of Fig. 2.

In the drawings, the invention has been illustrated as applied to a cultivator attachment for a tractor. The attachment comprises a tool frame 10 extending beneath the frame 9 of the tractor 8 and connected thereto by means of two pairs of parallel links 11 and 12, one pair being disposed at each side of the tractor. Each pair of links is connected to the tool frame by pivot joints 7 and supported from a bracket 13 bolted to the side of the tractor frame 9 by means of bolts 14. The upper link 11 is fixed to an arm 15 pivoted upon a laterally extending pin 16. The pin 16 extends through a perforation in a support 17 fixed to the bracket 13, and is welded thereto. At its inner end, the pin 16 is welded to bracket 13. The lower link 12 has an inwardly bent portion fastened by means of a cotter pin 18 in a sleeve 19 extending between and journaled in the bracket 13 and the corresponding bracket on the opposite side of the tractor.

The depth at which the cultivating tools operate, as well as the lifting of the tools to an inoperative position, is controlled by two similar mechanisms disposed on opposite sides of the tractor. Each mechanism comprises a rod 20 having a lost motion connection with the power lift mechanism 22 disposed at the rear of the tractor. A lifting arm 23, fixed to the lifting rock shaft 24 of the power lift, is provided with an eye bolt 25 through which the rod 20 extends. In the operation of the power lift 22, the lifting arm 23 is rocked, causing the eye bolt 25 to engage the hub of a hand wheel 26, rigidly fixed on the rod 20, thereby effecting a forward movement of the rod 20. For a detailed description of the construction and operation of the power lift, reference may be had to the McCormick, Worthington, Stewart copending application, Serial No. 749,706, filed October 24, 1934.

The rod 20 is connected to the upper end of arm 15 by means of a swivel 27. Inasmuch as arm 15 is fixed to link 11, a forward movement of rod 20 causes a clockwise rotation of link 11, resulting in the lifting of the cultivating tools out of operating position.

The depth of operation of the tools is controlled by means of a stop collar 30 slidably disposed on a sleeve 31. Sleeve 31 is provided with an internally threaded portion 32 threaded upon threads 33 on the forward end of rod 20. A loop-shaped lever 35 is pivoted on trunnions 36 on collar 30, and carries a set screw 37, the head of which extends through an opening 38 in the collar 30 and engages the shoulders of any one of a number of recesses 39 in the underside of sleeve 31. The lever is normally held in an upright position with set screw 37 disposed in one of the recesses 39 by a tension spring 50 connected to the lower end 51 of lever 35 and anchored to the rear end of arm 54 fixed to and extending rearwardly from an arm 53 which in turn is pivoted to the upper end of support 17. When the tools are in operating position, the stop collar 30 bears against a stop 45 formed by the laterally bent end portion of arm 53, such laterally bent portion being provided with an opening through which sleeve 31 extends.

The depth at which the tools operate is determined by the position of stop collar 30 on sleeve 31 and by the position of sleeve 31 on rod 20. The depth of operation of the tools may be finely adjusted by turning the hand wheel 26, which will rotate the rod 20 and change its position with respect to sleeve 31 in which its forward end is threaded. The outer periphery of sleeve 31 is of rectangular cross-section, and the inner periphery of collar 30 is of similar shape. When rod 20 is rotated, the inner side of lever 35 bears against arm 53 to prevent collar 30 and sleeve 31 turning with rod 20. If it is desired to change the depth of operation of the tools an appreciable amount, the position of collar 30 on sleeve 31 is changed. This is accomplished by means of a rope 60 connected to the end of lever 35. Pulling rope 60 will rock lever 35 rearwardly on trunnions 36, and cause set screw 37 to be withdrawn from the recess 39 in which it is disposed, thereby freeing collar 30 from sleeve 31. The weight of the tool bar and tools, plus the natural tendency of the tools to run deeper, will draw them down causing sleeve 31 to move rearwardly relative to collar 30. After the tools have reached the desired depth, rope 60 is released. This will permit set screw 37 to reengage in another of the recesses 39, whereupon further downward movement of the tools wil be prevented. A stop 62 on the forward end of sleeve 31 prevents sleeve 31 from being drawn free of collar 30. The rear end of rope 60 is fastened to a snap ring 61 connected to the tractor seat.

If an appreciably shallower depth of operation is desired, the operator first operates the power lift to raise the tools into inoperative position, the parts assuming a position as shown in Fig. 3. The operator may now give one or more quick jerks on rope 60. At each jerk, lever 35 will be rocked to cause set screw 37 to disengage from the recess 39 in which it is disposed, and spring 50 will function to pull collar 30 rearwardly on sleeve 31. As soon as rope 60 is released, set screw 37 will again engage a recess 39. By properly manipulating rope 60, collar 30 can be moved one or more positions as determined by the spacing of recesses 39. Then, by again operating the power lift to lower the tools, rod 20 will recede until collar 30 in its new position again strikes stop 45.

There are times when an operator may have one implement, such as a planter, connected at the rear of a tractor and another implement, such as a cultivator disclosed in the drawings, connected at the forward end of the tractor. He may wish to operate the planter without the cultivator engaged, and may wish to control the raising and lowering of the planter through the regular power lift of the tractor. The adjusting mechanism of my invention provides for locking the implement at the front of the tractor in an inoperative position independently of the power lift of the tractor. To so lock the implement at the front of the tractor in a raised position, it is merely necessary to dispose the collar 30 on the sleeve 31 with set screw 37 in the last recess 39ª. This may be accomplished merely by holding the rope 60, when the tools are in a raised position as shown in Fig. 3, until the spring 50 has pulled the collar 30 against the stop 45. Thereupon, the power lift may be actuated without affecting the position of the tools at the front end of the tractor.

In the use of an implement in which the ground-working tools on one side of the tractor are separate from the ground-working tools on the opposite side of the tractor, it is occasionally desirable to operate only with the tools on one side of the tractor. With my adjusting mechanism, this can be readily accomplished since the adjusting mechanism on the two sides of the tractor are entirely independent. The adjusting mechanism on one side of the tractor may be positioned to lock the tools on that side of the tractor in inoperative position, as described in the preceding paragraph, independently of the position of the tools on the opposite side of the tractor. The tools that are being used can be raised and lowered through the agency of the power lift in the regular way.

To disconnect the implement from the tractor, snap ring 61 is freed from the seat of the tractor, bolts 14 are removed, and then the implement is pulled forwardly to withdraw rod 20 from eye bolt 25. Inasmuch as the depth-adjusting mechanism is mounted partially on rods 20 and partially on supports 17 fixed to bracket 13, no other disconnection need be made.

Having described a preferred embodiment of my invention, what I consider new and desire to have protected by Letters Patent is set forth in the following claims. It is to be understood, however, that I do not wish to be limited to the particular construction as shown and described, but I intend to cover all equivalent forms.

What is claimed is:

1. The combination with an implement including a support and a ground-working tool movable vertically relative to said support, of means including a rotatable member movable longitudinally of itself to shift said tool, and means controlled by rotation of said member for limiting the extent of movement of said tool.

2. The combination with an implement including a support and a ground-working tool movable vertically relative to said support, of means including a member supported for rotation about a longitudinal axis and movable axially to shift said tool, means controlled by the rotation of said member for shifting said tool, and another member movable longitudinally of said first member for controlling the position of said tool.

3. The combination with an implement including a support and a tool movable with respect to said support, of means for controlling the position of said tool comprising a longitudinally movable rod connected to said tool, a member threaded upon said rod, a second member movable to different positions on said first member, and a stop cooperating with said second member to limit the movement of said rod in one direction.

4. The combination with an implement including a support and a tool movable with respect to said support, of means for controlling the position of said tool comprising a longitudinally movable rod connected to said tool, a member movable to different positions relative to said rod, a manually controlled lock for locking said member in any selected position, spring means tending to move said member in one direction relative to said rod, and a stop for limiting the movement of said member in said one direction.

5. The combination with an implement including a support and a tool movable with respect to said support, of means for controlling the position of said tool comprising a longitudinally movable rod connected to said tool, means for moving said rod in one direction, a member threaded upon said rod and movable to different positions on said rod by turning said rod, and a stop cooperating with said member to limit the movement of said rod in the other direction.

6. The combination with an implement attachment having a supporting bracket adapted for detachable connection with a tractor, and including a ground-working tool movable with respect to said bracket, of means for controlling the position of said tool comprising a member movable in one direction to shift said tool in one direction, a stop collar movable into different positions on said member, and a stop carried by said bracket and cooperating with said collar to limit the movement of said tool in the other direction.

7. In a device of the class described, a tool-operating arm, an actuating rod connected to said arm, a sleeve embracing said rod and axially adjustable thereon, a collar embracing said sleeve, said collar being movable axially of said sleeve to a plurality of spaced positions, and a stop disposed in fixed position and adapted to engage said collar to limit longitudinal movement of said rod in one direction.

8. In a device of the class described, a tool-operating arm, means for actuating said arm including a longitudinally movable threaded rod connected thereto, a sleeve embracing said rod and having internal threads adapted to cooperate with the threads on said rod, a collar embracing said sleeve, said collar being movable axially of said sleeve and having means for fixing its position relative to the sleeve, and a fixed supporting bracket having a stop adapted to engage said collar to limit said axial movement of the latter, whereby an approximate adjustment of the limit of movement of said arm is obtained by adjusting said collar on said sleeve, while finer adjustments are obtained by adjusting said sleeve relative to said threaded rod.

9. In a device of the class described, a tool-operating arm, means for actuating said arm including a longitudinally movable threaded rod connected thereto, an internally threaded sleeve embracing said rod and cooperating with the threads thereon, said sleeve having spaced recesses in its outer surface, a collar embracing said sleeve, a detent member secured to said collar and normally adapted to engage one of said recesses to prevent axial movement of said collar on said sleeve, means for optionally disengaging said detent member from said recess to permit axial adjustment of the collar on the sleeve, a stop, and fixed supporting means therefor, said stop being adapted to engage said collar to limit the extent of axial movement of said rod, whereby an approximate adjustment of the limit of movement of said arm is obtained by adjusting said collar on said sleeve, while finer adjustments are obtained by rotating said threaded rod within said threaded sleeve.

10. In a device of the class described, a tool-operating arm, means for actuating said arm including a longitudinally movable threaded rod connected thereto, an internally threaded sleeve embracing said rod and cooperating with the threads thereon, said sleeve having spaced recesses in its outer surface, a collar embracing said sleeve, said collar having an aperture therein, a lever pivotally mounted on said collar, a detent secured to said lever and normally adapted to extend through the aperture in said collar and engage one of the recesses in said sleeve to prevent relative axial movement of said collar and said sleeve, said detent being disengageable from the recess by pivoting said lever on said collar, to permit axial adjustment of the collar on the sleeve, a stop, and fixed supporting means therefor, said stop being adapted to engage said collar to limit the extent of axial movement of said rod, whereby an approximate adjustment of the limit of movement of said arm is obtained by adjusting said collar on said sleeve, while finer adjustments are obtained by rotating said threaded rod within said threaded sleeve.

11. In a device of the class described, an operating arm, means for actuating said arm including a longitudinally movable member connected thereto, said member having recesses spaced longitudinally therein, a collar embracing said member, a detent member secured to said collar and normally adapted to engage one of said recesses to prevent axial movement of said collar on said member, means for optionally disengaging said detent member from said recess to permit axial adjustment of the collar on the member, a stop, and fixed supporting means therefor, said stop being adapted to engage said collar to limit the extent of axial movement of said member.

12. In a device of the class described, an operating arm, means for actuating said arm including a longitudinally movable member connected thereto, said member having recesses spaced longitudinally therein, a collar embracing said member, said collar having an aperture therein, a lever pivotally mounted on said collar, a detent secured to said lever and normally adapted to extend through the aperture in said collar and engage one of the recesses in said member to prevent relative axial movement of said collar and said member, said detent being disengageable from the recess by pivoting said lever on said collar, to permit axial adjustment of the collar on the member, a stop, and fixed supporting means therefor, said stop being adapted to engage said collar to limit the extent of axial movement of said member.

13. In combination with an implement comprising a support and a ground-working tool movable relative to said support, means including a rod movable longitudinally of itself over a fixed range for shifting said tool, said rod also being adapted for rotation about its longitudinal axis, and means longitudinally adjustable relative to said rod responsive to rotation of the latter, for adjustably determining the limit of movement of said tool in one direction.

14. An implement adapted for attachment to a tractor having a power lift mechanism operable over a constant range, said implement comprising a tool-carrying frame, supporting linkage detachably mounted on said tractor for raising and lowering said frame, means including a longitudinally movable rod for connecting said linkage to said power lift mechanism, and means for adjusting the extent of movement of said tool frame independent of the range of movement of said power lift mechanism, said means comprising a member threaded on said rod for fine adjustment longitudinally relative thereto, a second member adjustable relative to said first member in predetermined steps of relatively coarse adjustment, and a fixed stop adapted to engage said second member.

15. An implement adapted for attachment to a tractor having a power lift mechanism operable over a constant range, said implement comprising a tool-carrying frame, supporting linkage detachably mounted on said tractor for raising and lowering said frame, means including a longitudinally movable rotatably supported rod for connecting said linkage to said power lift mechanism, and means responsive to a rotation of said rod about its longitudinal axis, for adjusting the extent of movement of said tool frame independent of the range of movement of said power lift mechanism.

16. In combination with a tractor having a power lift, a ground-working tool, supporting linkage mounted on said tractor providing for raising and lowering said tool relative to said tractor, a threaded rod attached to said linkage and adapted for engagement with said power lift to raise said tool, said power lift being free to move in the opposite direction independent of said rod, a sleeve threaded coaxially on said threaded rod, a stop member disposed on said sleeve, and means fixed on said tractor for engaging said stop member to limit the extent of downward movement of said tool, whereby said extent of downward movement is adjustable by rotating said rod about its longitudinal axis.

17. In combination with a tractor, a ground-working tool, supporting linkage therefor mounted on said tractor and providing for movement of said tool relative to said tractor, means for controlling the position of said tool comprising a member movable in one direction to shift said tool in one direction, a stop device adjustable on said member, means for locking said device in adjusted position, means including a lever pivoted on said stop device for disabling said locking means, and a stop attached to said tractor and engageable with said stop device to limit the movement of said tool in the other direction.

18. In combination with a tractor, a ground-working tool, supporting linkage therefor mounted on said tractor and providing for movement of said tool relative to said tractor, means for controlling the position of said tool comprising a member movable in one direction to shift said tool in one direction, a stop device adjustable on said member, means for locking said device in adjusted position, spring means for yieldingly holding said locking means in locking position, means operable from the tractor seat, for disabling said locking means against the action of said spring, and a stop attached to said tractor and engageable with said stop device.

19. In combination with a tractor, a ground-working tool, supporting linkage therefor mounted on said tractor and providing for movement of said tool relative to said tractor, means for controlling the position of said tool comprising a rod movable to shift said tool, a stop device movable longitudinally of said rod, disengageable means for locking said device in adjusted position, and a spring connected to said locking means, said spring being adapted to hold the latter in locked position and to urge said stop device longitudinally of said rod when said locking means is disengaged.

20. In combination with a tractor, a ground-working tool, supporting linkage therefor mounted on said tractor and providing for movement of said tool relative to said tractor, means for controlling the position of said tool comprising a member movable in one direction to shift said tool in one direction, a stop device adjustable on said member, means for locking said device in adjusted position, means including a lever pivoted on said stop device for disabling said locking means, a spring connected to said lever, for holding said locking means in locked position and to urge said stop device longitudinally of said rod when said locking means is disabled.

21. In combination with an implement comprising a support and a ground-working tool movable vertically relative to said support, means including a rod movable longitudinally of itself to raise said tool to a constant predetermined height, a member adjustable relative to said rod, a second member adjustable relative to said first member, and a stop attached to said support, adapted to engage said second member.

22. In combination with an implement comprising a support and a ground-working tool movable vertically relative to said support, means including a rod movable longitudinally of itself to raise said tool to a constant predetermined height, a member adjustable longitudinally of said rod in comparatively small increments, a second member adjustable longitudinally of said first member in comparatively large increments, and a stop attached to said support and adapted to engage said second member.

23. In combination with a tractor having power lift mechanism, an implement comprising a ground working tool movable vertically relative to the tractor between operative and transport positions, means including a rotatable member for connecting said power lift mechanism with said tool for raising and lowering the latter, means for adjustably limiting the lower extent of movement of said tool under control of said power lift mechanism, and means responsive to rotation of said connecting member for adjusting the depth of operation of said tool when the latter is in lowered position.

24. In combination with a tractor having power lift mechanism, an implement comprising a ground working tool movable vertically relative to the tractor between operative and transport positions, means including a rotatable operating rod for connecting said power lift mechanism with said tool whereby the latter is raised from operative position to a constant level transport position, adjustable means for limiting the movement of said tool in a downward direction under control of said power lift mechanism, and means responsive to rotation of said operating rod for adjusting the tool vertically when the latter is in lowered position.

25. In combination with a tractor having power lift mechanism including an actuating rock shaft and a lifting arm mounted on said shaft, an implement comprising a ground working tool movable vertically relative to the tractor between operative and transport positions, means including a rotatable operating rod for connecting said lifting arm and said tool and also including a lost motion connection whereby said lifting arm is permitted to return to its lowered position when the movement of said tool is interrupted at any point in its downward travel, means for optionally interrupting the downward movement of said tool to approximate the depth of operation thereof, and means responsive to manual rotation of said operating rod for obtaining an additional adjustment of the depth of operation of said tool.

26. In combination with a tractor having power lift mechanism including a transversely disposed rock shaft mounted near the rear of the tractor and a lifting arm attached to said shaft, a ground working tool disposed near the forward end of said tractor and connected thereto by means providing for vertical movement of said tool relative to said tractor, a connecting rod extending along the side of said tractor, means for connecting the forward end of said rod with said tool, means for connecting the rear end of said rod with said lifting arm providing for lost motion therebetween whereby said lifting arm engages said rod to lift said tool but said arm is free to return to normal position independent of said rod, said connecting means also providing for rotation of said rod about a longitudinally extending axis, means for adjustably limiting the extent of motion in a downward direction under control of said power lift mechanism, and means responsive to rotation of said connecting rod for additionally adjusting the lower limit of movement of said tool.

MILES H. TUFT.